UNITED STATES PATENT OFFICE.

WILLIAM HALSTED, OF TRENTON, NEW JERSEY.

ARTIFICIAL FUEL.

Specification forming part of Letters Patent No. 45,922, dated January 17, 1865.

*To all whom it may concern:*

Be it known that I, WILLIAM HALSTED, of the city of Trenton, and State of New Jersey, have discovered a new and useful improvement in the mode and manner of making artificial fuel of certain ingredients—viz., peat, turf of salt-meadow or salt-marsh, or bog-turf, coal-tar, or tar produced from or by the distillation of coal, refuse anthracite coal, refuse coke from distilled coal, refuse wood cuttings, chippings, sawdust, or refuse tanners' bark, mixed or used together in different ways, modes, quantities, and combinations—of which the following is a specification.

The nature of my invention is the combining some or all of the ingredients above mentioned together in certain ways, modes, and proportions hereinafter specified, and treating them in the way hereinafter described.

*First kind of fuel.*—Cut pieces of peat or turf of salt-meadow or salt-marsh or bog-turf into blocks or parallelograms or cubes of from one inch to three and a half inches each way, or any other convenient size, and dry them and then dip them in coal-tar, and then roll them in sawdust, refuse tanners' bark, refuse anthracite coal-dust, refuse coke-dust or charcoal-dust, or the chippings of wood or shavings or chaff or cut sedge or coarse grass dried and cut fine.

*Second kind.*—Cut peat-turf of salt-marsh or salt-meadow or bog-turf into blocks or cubes of from two to five inches each way, or in the shape of a parallelogram from three to five inches long and from two to three inches thick, and cut out, scoop out, or excavate the center or middle part of the block in any convenient way, so as to make a hole, excavation, or aperture of the size of from one inch to two inches wide and from one to two inches deep. Fill this hole, excavation, or aperture with anthracite refuse coal, or refuse coke, or refuse charcoal, and close up the hole or aperture with peat, turf, wood, or other combustible material. Dry the peat or turf, and after it is dried dip it into coal-tar, and then roll it in sawdust or in one of the other materials mentioned under the preceding description of the first kind of fuel.

*Third kind.*—Made in the same manner as the second, except after it is dried it is dipped into a paste made of one-half part sawdust, one-quarter part coal-tar, and one-quarter part of rye-paste or glue or mucilage.

*Fourth kind.*—Made in the same manner as the first kind, with the exception that instead of being dipped in coal-tar it is dipped in a paste or mixture made as described above under the "third kind."

*Fifth kind.*—Cut peat or turf of salt-marsh or bog-turf, and scoop it out or excavate it, as described in the description above given under the "second kind," and then fill the hole, aperture, or excavation with refuse coal, and then close it up, as thereinabove described.

I do not claim as my invention any one of the ingredients above enumerated; but

What I claim is—

The combination and mixture of the ingredients in the manner and proportions above described.

Trenton, August 25, A. D. 1864.

WM. HALSTED.

Witnesses:
 AMNE S. MILLACH,
 B. B. HALSTED.